(12) United States Patent
Gremetz

(10) Patent No.: US 11,059,019 B2
(45) Date of Patent: Jul. 13, 2021

(54) FLOW REACTOR FLUID CONNECTION APPARATUS AND METHOD

(71) Applicant: CORNING INCORPORATED, Corning, NY (US)

(72) Inventor: Sylvain Maxime F Gremetz, Montereau Fault Yonne (FR)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 16/753,445

(22) PCT Filed: Oct. 2, 2018

(86) PCT No.: PCT/US2018/053959
§ 371 (c)(1),
(2) Date: Apr. 3, 2020

(87) PCT Pub. No.: WO2019/070701
PCT Pub. Date: Apr. 11, 2019

(65) Prior Publication Data
US 2020/0316554 A1     Oct. 8, 2020

Related U.S. Application Data

(60) Provisional application No. 62/568,791, filed on Oct. 6, 2017, provisional application No. 62/593,211, filed on Nov. 30, 2017.

(51) Int. Cl.
*B01J 19/00*     (2006.01)
*B01J 19/24*     (2006.01)

(52) U.S. Cl.
CPC ....... *B01J 19/0073* (2013.01); *B01J 19/0093* (2013.01); *B01J 19/242* (2013.01);
(Continued)

(58) Field of Classification Search
CPC .. B01J 19/0093; B01J 19/0073; B01J 19/242; B01J 2219/00792; B01J 2219/0081;
(Continued)

(56) References Cited

U.S. PATENT DOCUMENTS 648,232 A * 4/1900 Brandt ................ F16L 19/0212
                                                285/331
3,599,820 A * 8/1971 Lee .................... B65D 39/0047
                                                215/364
(Continued)

FOREIGN PATENT DOCUMENTS

GB         1149852 A     4/1969

OTHER PUBLICATIONS

International Search Report and Written Opinion of the International Searching Authority; PCT/US2018/053959; dated Jan. 25, 2019; 10 Pages; European Patent Office.

*Primary Examiner* — Lessanework Seifu

(57) ABSTRACT

A flow reactor [10] includes a fluidic module [20] having an external surface [22], an internal process fluid path [24], and an input port [I] and an output port [O] connected to the process fluid path [24]. An upstream coupler [30] is connected to the input port [I], and a downstream coupler [40] is connected to the output port [O]. The upstream coupler [30] has a gasket [38] in a gasket groove [36] pressed against the fluidic module [22] and a hollow circular cylindrical post [35] protruding from the upstream coupler [32] and extending into the input port [I]. The downstream coupler [40] has a gasket [48] in a gasket groove [46] pressed against the fluidic module [20] and no hollow circular cylindrical post extending into the output port [O].

11 Claims, 3 Drawing Sheets

(52) U.S. Cl.
CPC .............. *B01J 2219/00792* (2013.01); *B01J 2219/00808* (2013.01); *B01J 2219/00813* (2013.01); *B01J 2219/00824* (2013.01); *B01J 2219/00831* (2013.01); *B01J 2219/00871* (2013.01); *B01J 2219/00894* (2013.01)

(58) Field of Classification Search
CPC .... B01J 2219/00813; B01J 2219/00824; B01J 2219/00831; B01J 2219/00871; B01J 2219/00894; F16L 19/0218; F16L 21/02; F16L 21/04; F16L 21/05; F16L 37/101; F16L 47/065; F16L 47/08; F16L 47/16; F16L 47/28
See application file for complete search history.

(56) References Cited

U.S. PATENT DOCUMENTS

| | | | |
|---|---|---|---|
| 7,125,055 B2 * | 10/2006 | Dallas | ................ F16L 19/0218 |
| | | | 285/354 |
| 8,636,964 B2 | 1/2014 | Brunello et al. | |
| 9,126,202 B2 | 9/2015 | Lobet et al. | |
| 9,500,319 B2 | 11/2016 | Lingvall et al. | |
| 2009/0297410 A1 * | 12/2009 | Lobet | ..................... B01F 5/045 |
| | | | 422/600 |
| 2012/0045377 A1 * | 2/2012 | Gremetz | ............. B01J 19/0093 |
| | | | 422/603 |
| 2012/0114534 A1 | 5/2012 | Van Der Heijden | |
| 2017/0165632 A1 | 6/2017 | Homewood et al. | |
| 2018/0221844 A1 | 8/2018 | Brenner et al. | |

* cited by examiner

FLOW REACTOR FLUID CONNECTION APPARATUS AND METHOD

CROSS-REFERENCE TO RELATED APPLICATIONS

This application claims the benefit of priority under 35 U.S.C. § 371 of International Application No. PCT/US2018/053959, filed on Oct. 2, 2018, which claims the benefit of priority under 35 U.S.C. § 119 of U.S. of U.S. Provisional Application No. 62/568,791, filed Oct. 6, 2017 and Provisional Application No. 62/593,211, filed Nov. 30, 2017, the contents of each of which are incorporated herein by reference in their entirety.

FIELD

The present disclosure relates to flow reactor technology, and in particular to a system, apparatus, and method for removable fluid connectors used or useful with glass and ceramic flow reactor modules, the fluid connectors exhibiting improved chemical resistance.

BACKGROUND

Corning has developed and commercialized continuous flow reactors to perform chemical reactions. These reactors are modular and configurable and/or reconfigurable by the selective arrangement and fluidic interconnection of particular glass and/or ceramic (SiC) flow modules. In the flow modules, reactants circulate inside fluidic channels defined by microstructures. Reactant channels typically reside in a layer sandwiched between thermal control channels in which a heat exchange fluid is flowed.

Glass reactors and SiC ceramic reactors of various sizes are able to address a large range of flow rates, providing a large range of chemical reaction throughput, such that these modular flow reactors can address needs from laboratory investigations to chemical production, particularly for fine and specialty chemicals.

For both types of fluidic channels in these reactors (process channels with process fluids such as chemical reactants, and thermal control channels with heat exchange fluid), fluid connections between fluidic modules and piping or tubing are made leak-free by gaskets (gaskets of specific materials which can vary depending on the needs of the chemistry, temperature, and other factors of the process to be performed). Gaskets on the reactive (or process) channel, especially at higher temperatures, can in some cases have a shorter lifetime than is currently desired.

SUMMARY

An aspect of the disclosure relates to a flow reactor comprising a fluidic module having an external surface, an internal process fluid path, and an input port and an output port each in the form of an opening in the external surface, with the process fluid path extending from the input port to output port. An upstream coupler is connected to the input port, the upstream coupler comprising an upstream coupler body having an upstream gasket, the upstream gasket pressed against the external surface of the fluidic module by an upstream coupler face of the upstream coupler body and surrounding the input port. A downstream coupler is connected to the output port, the downstream coupler comprising a downstream coupler body and a downstream gasket, the downstream gasket pressed against the external surface of the fluidic module by a downstream coupler face of the downstream coupler body and surrounding the output port.

The upstream coupler body comprises an upstream gasket groove in the upstream coupler face holding the upstream gasket, and a hollow circular cylindrical post protruding from the upstream coupler face and extending into the input port. The downstream coupler body comprises a downstream gasket groove in the downstream coupler face holding the downstream gasket, and no hollow circular cylindrical post extending into the output port.

Other aspects which can desirably be combined with this aspect include an unused port in the form of an opening in the external surface of the fluidic module in fluid communication with the process fluid path, with the unused port being closed by a plug, where the plug comprises a plug body and a plug gasket with the plug gasket pressed against the external surface of the fluidic module by the plug body and with the gasket surrounding the unused port. The plug body comprises a plug gasket groove holding the plug gasket and a solid circular cylindrical post extending into the unused port.

According to other optional but desirable aspects, the plug gasket groove has a plug gasket groove inner diameter, and the plug gasket, in a relaxed pre-use state, has a plug gasket inner diameter, and the plug gasket inner diameter is smaller than the plug gasket groove inner diameter.

According to still further optional but desirable aspects, the plug gasket groove has a plug gasket groove outer diameter and the plug gasket, in the relaxed pre-use state, has a plug gasket outer diameter, and the plug gasket outer diameter is smaller than the plug gasket groove outer diameter.

According to yet further optional but desirable aspects, both (1) the upstream gasket groove has an upstream gasket groove inner diameter and the upstream gasket, in a relaxed pre-use state, has an upstream gasket inner diameter and the upstream gasket inner diameter is smaller than the upstream gasket groove inner diameter, and (2) the downstream gasket groove has a downstream gasket groove inner diameter and the downstream gasket, in a relaxed pre-use state, has a downstream gasket inner diameter and the downstream gasket inner diameter is smaller than the downstream gasket groove inner diameter.

According to still further optional but desirable aspects, both (1) the upstream gasket groove has an upstream gasket groove outer diameter and the upstream gasket, in the relaxed pre-use state, has an upstream gasket outer diameter and the upstream gasket outer diameter is smaller than the upstream gasket groove outer diameter, and (2) the downstream gasket groove has a downstream gasket groove outer diameter and the downstream gasket, in the relaxed pre-use state, has a downstream gasket outer diameter and the downstream gasket outer diameter is smaller than the downstream gasket groove outer diameter.

According to still another optional but desirable aspect, the downstream coupler face has a downstream coupler passage opening, and the opening has a diameter larger than a diameter of the output port.

Another embodiment of the disclosure is directed to a fluid conduit with fluid couplers, for use in a flow reactor having modules having input and output ports in the form of openings in an external surface of the respective modules, with the conduit comprising a tube or pipe or a series of tubes or pipes forming a fluid conduit and having an upstream conduit end and a downstream conduit end and a passage therethrough from the upstream conduit end to the downstream conduit end.

The conduit with couplers further comprises a downstream coupler body having a passage therethrough including an opening in a downstream coupler face of the downstream coupler body. The opening is surrounded by a downstream gasket groove in the downstream coupler face for holding a downstream gasket.

The conduit with couplers further comprises an upstream coupler body having a passage therethrough including an opening in an upstream coupler face surrounded by an upstream gasket groove in the upstream coupler face for holding an upstream gasket.

The downstream coupler body is fastened to the upstream conduit end and oriented with the downstream coupler face facing away from the upstream conduit end, and the upstream coupler body is fastened to the downstream conduit end and oriented with the upstream coupler face facing away from the downstream conduit end.

The upstream coupler body comprises a hollow circular cylindrical post protruding from the upstream coupler face (containing the opening in the upstream coupler face) and the downstream coupler body comprises no hollow circular cylindrical post protruding from the downstream coupler face.

According to one additional optional and desirable aspect of this embodiment, the opening in the downstream coupler face has an internal diameter $D_{DC}$, and the hollow circular cylindrical post protruding from the upstream coupler face has an external diameter d, and $D_{DC} > d$.

Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

The terms "downstream" and "upstream" refer to the relative locations of a component, element, etc., based on the intended or "in use" direction of travel of a fluid, so that A being downstream of B means that a fluid first passes B and then passes A. Likewise, A being upstream of B means that a fluid first passes A and then passes B.

Figure 1:
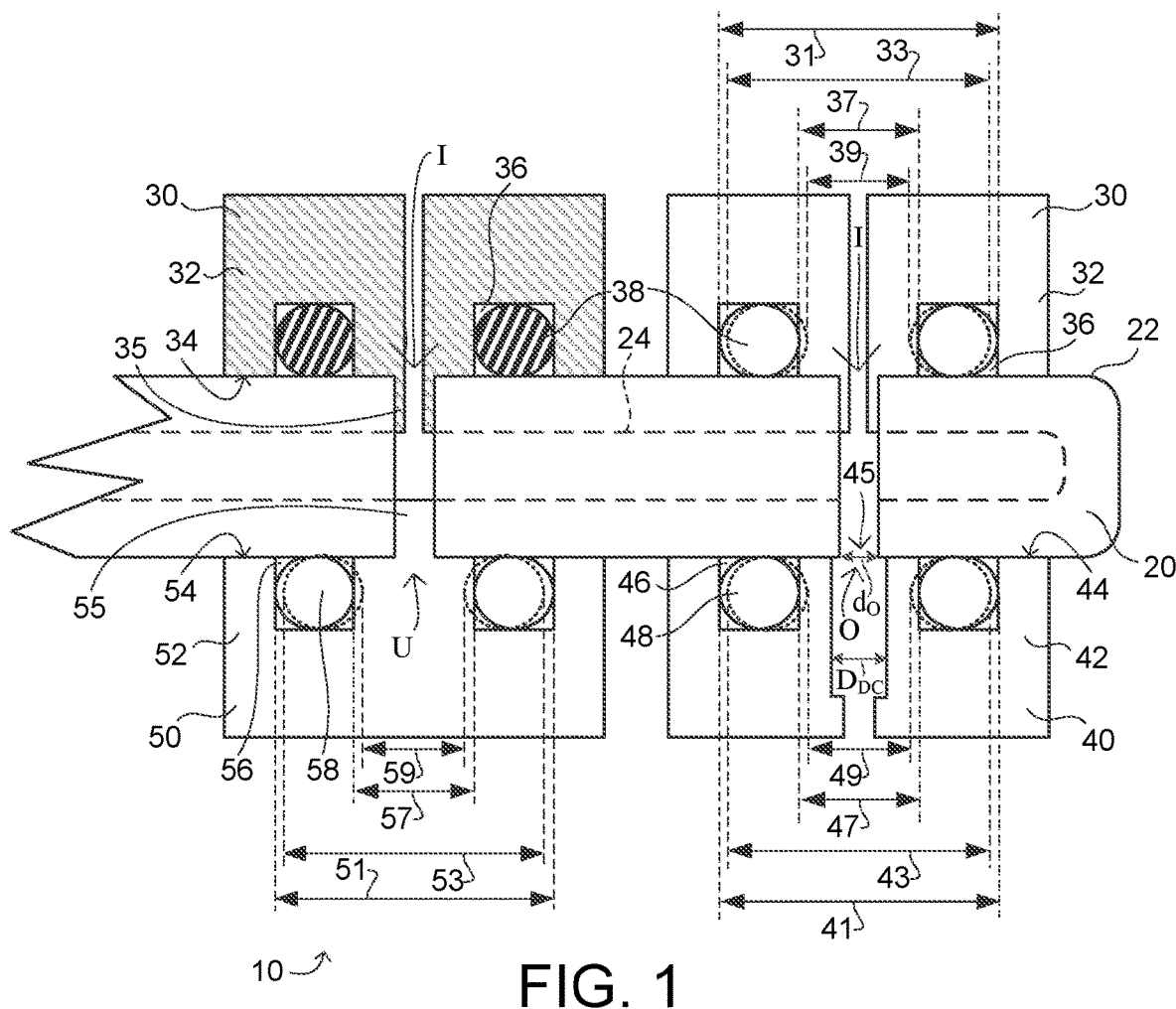
FIG. 1 is a diagrammatic cross-sectional representation of a portion of a flow reactor according to one aspect of the present disclosure.

FIG. 1 shows a diagrammatic cross section of a flow reactor 10 including at least one fluidic module 20. With reference to FIG. 1, according to one aspect of the present disclosure, a flow reactor 10 comprises a fluidic module 20 having an external surface 22, an internal process fluid path 24, and an input port I and an output port O each in the form of an opening in the external surface, the process fluid path 24 extending from the input port I to the output port O.

The reactor 10 also includes an upstream coupler 30 connected to the input port I. The upstream coupler 30 includes an upstream coupler body 32 having an upstream coupler face, and an upstream gasket 38. The upstream gasket 38 is pressed against the external surface 22 of the fluidic module 20 by the upstream coupler face 34 of the upstream coupler body 32, and surrounds the input port I.

The reactor 10 further includes a downstream coupler 40 connected to the output port O. The downstream coupler 40 includes a downstream coupler body 42 having a downstream coupler face 44, and a downstream gasket 48. The downstream gasket 48 is pressed against the external surface 22 of the fluidic module 20 by the downstream coupler face 44 of the downstream coupler body and surrounds the output port O.

The upstream coupler body further includes an upstream gasket groove 36 in the upstream coupler face 34 holding the upstream gasket 38, and a hollow circular cylindrical post 35 protruding from the upstream coupler face 34 and extending into the input port I. The downstream coupler face 42 further includes a downstream gasket 46 groove in the downstream coupler face 44 holding the downstream gasket 48, and includes no hollow circular cylindrical post extending into the output port O. The grooves 36, 48 desirably have facing concentric inner and outer walls. In embodiments, the height of the grooves is 25% smaller than the associated gasket cross-sectional diameter. In embodiments, the width of the grooves is 25% larger than the gasket cross-sectional diameter. In embodiments, the bottom corners of the grooves are rounded. In embodiments, and the top corners are chamfered.

The flow reactor 10 of this aspect may further include additional input ports I or additional output ports O and one or more unused ports U in the form of additional openings in the external surface 22 of the fluidic module 20, one in the case of FIG. 1. (The unused port U is in fluid communication with the process fluid path 24 and is intended for use in configurations of the reactor 10 other than the one shown in part in FIG. 1.) The unused port U is closed by a plug 50. The plug 50 comprises a plug body 52 having a plug face 54, and a plug gasket 58. The plug gasket 58 is pressed against the external surface 22 of the fluidic module 20 by the plug face 54 of the plug body 52, and surrounds the unused port U. The plug body 52 further comprises a plug gasket groove 56 holding the plug gasket 58, and a solid circular cylindrical post 55 extending into the unused port U.

In the flow reactor 10, the plug gasket groove 56 has a plug gasket groove inner diameter 57 and the plug gasket 58, in a relaxed pre-use state, desirably has a plug gasket inner diameter 59 smaller than the plug gasket groove inner diameter 57, such that the plug gasket 58 is constrained on its inner diameter so as to be held in place within the plug gasket groove 58. (In FIG. 1, dotted outlines of gaskets 38, 48, 58 represent the gaskets in their relaxed, pre-use states. Dimensions are not necessarily to scale.) Further, the plug gasket groove 56 has a plug gasket groove outer diameter 51, the plug gasket 58, in the relaxed pre-use state, has a plug gasket outer diameter 53, and the plug gasket outer diameter 53 is desirably smaller than the plug gasket groove outer diameter 51 such that the plug gasket 58 is generally not constrained on its outer diameter, or at least not before compression against the surface 22.

Further, it is desirable that the upstream gasket groove 36 has an upstream gasket groove inner diameter 37, the upstream gasket 38, in a relaxed pre-use state, has an upstream gasket inner diameter 38, and that the upstream gasket inner diameter 38 is less than the upstream gasket groove inner diameter 37. The difference can be in the range of 0.05 mm to 0.2 mm, desirably 0.08 to 0.15 mm, or about 0.1 mm. Likewise, it is desirable that the downstream gasket groove 46 has a downstream gasket groove inner diameter 47, the downstream gasket 48, in a relaxed pre-use state, has a downstream gasket inner diameter 49, and that the downstream gasket inner diameter 48 is less than the downstream gasket groove inner diameter 47, with the same range of difference.

Similarly, it is desirable that the upstream gasket groove 36 has an upstream gasket groove outer diameter 31, the upstream gasket 38, in the relaxed pre-use state, has an upstream gasket outer diameter 33, and that the upstream gasket outer diameter 33 is less than the upstream gasket groove outer diameter 31. Again similarly, it is desirable that the downstream gasket groove 46 has a downstream gasket groove outer diameter 41, the downstream gasket 48, in the relaxed pre-use state, has a downstream gasket outer diameter 43, and that the downstream gasket outer diameter 43 is less than downstream gasket groove outer diameter 41.

As yet another additional desirable option, the downstream coupler face 44 can have a downstream coupler passage opening 45 with the opening having a diameter $D_{DC}$ larger than a diameter do of the associated output port O.

Figure 2:
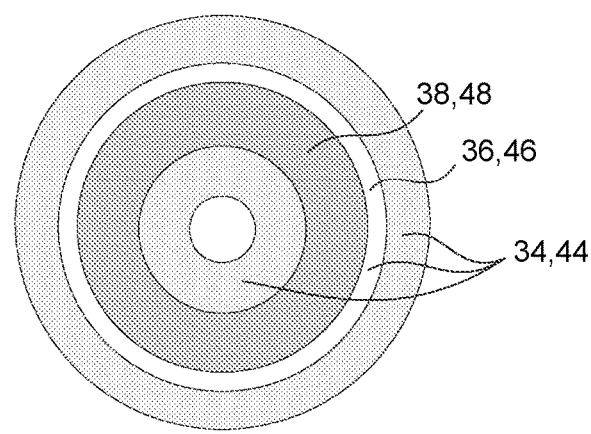
FIG. 2 is a plan view of a gasket (an O-ring) inside a groove, illustrating desirable dimensional relationships.

Greater deterioration of test gaskets was found to occur when gaskets were constrained on their large or outer diameters, and less deterioration when gaskets were constrained against the inside diameter of the grooves. Accordingly, as discussed above, it is desirable that the outer diameter 31, 41, 51 of the groove 38, 48, 58 is larger than the outer diameter 33, 43, 53 of the gasket 38, 48, 58, and/or that the inner diameter 39, 49, 59, of the gasket 38,48,58, when relaxed, is smaller than an inner diameter of the groove 37, 47, 57, as shown in cross section in FIG. 1 diagrammatically in a view of the upstream or downstream coupler face 34, 44, in FIG. 2.

Figure 3:
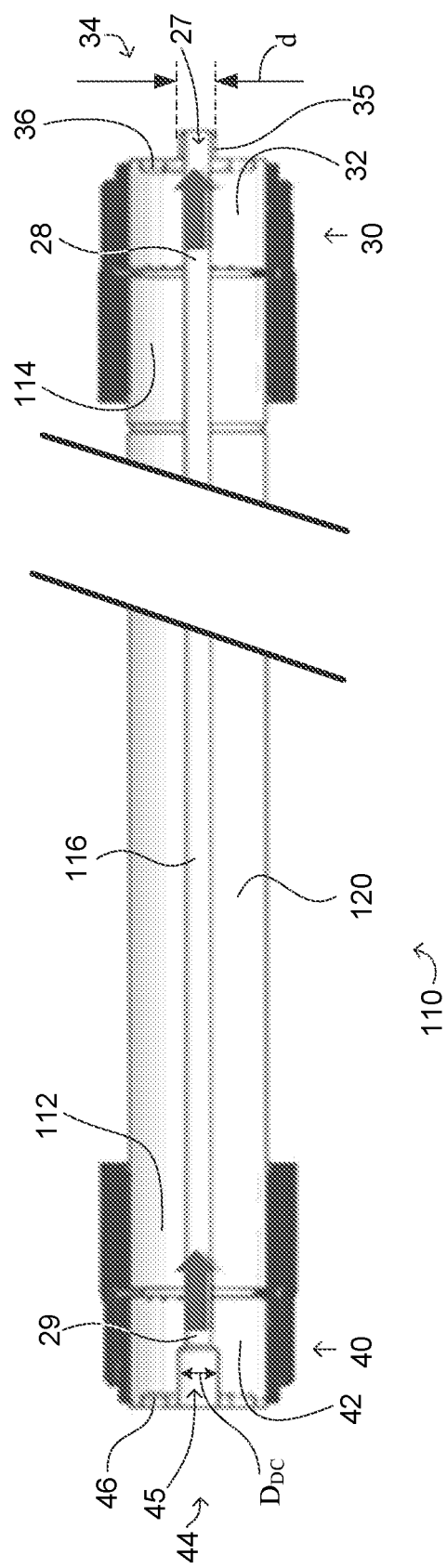
FIG. 3 is a perspective drawing represented with partial cutaway and partial transparency to show details of a fluid conduit with couplers according to another aspect of the present disclosure.

According to another aspect of the present disclosure and with reference to FIG. 3, a fluid conduit 110 with fluid couplers 30, 40 for use in a flow reactor is provided, the conduit 110 especially intended for reactors having modules with input and output ports in the form of openings in an external surface of the respective modules. The conduit 110 desirably is formed of a chemical-resistant polymer, such as a fluoropolymer, such as perfluoroalkoxy (PFA), fluorinated ethylene propylene (FEP), and polytetrafluoroethylene (PTFE). The conduit 110 with couplers 30, 40 comprises a tube or pipe 120 or a series of tubes or pipes 120 forming a fluid conduit 110 and having an upstream conduit end 112 and a downstream conduit end 114 and a passage 116 therethrough from the upstream conduit end 112 to the downstream conduit end 114. The fluid conduit with couplers further comprises a downstream coupler body 42 having a passage 29 therethrough including an opening 45 in a downstream coupler face 44 of the downstream coupler body 42. The opening 45 is surrounded by a downstream gasket groove 46 in the downstream coupler face 44 for holding a downstream gasket (not shown in FIG. 3). The conduit 110 with couplers 30, 40 further comprises an upstream coupler body 32 having a passage 28 therethrough including an opening 27 in an upstream coupler face 34 surrounded by an upstream gasket groove 36 in the upstream coupler face 34 for holding an upstream gasket. The downstream coupler body 42 is fastened to the upstream conduit end 112 and oriented with the downstream coupler face 44 facing away from the upstream conduit end 112, and the upstream coupler body 32 is fastened to the downstream conduit end 114 and oriented with the upstream coupler face 34 facing away from the downstream conduit end 114. Further according to this aspect, the upstream coupler body 32 (at the downstream conduit end 114) comprises a hollow circular cylindrical post 35 protruding from the upstream coupler face 34 in which the opening 27 resides, and the downstream coupler body 42 (at the upstream conduit end 112) comprises no hollow circular cylindrical post protruding from the downstream coupler face 44. Note that the term "fastened", as used herein, specifically includes embodiments in which the recited fastened structure is of a single continuous piece of material together with the recited structure with which it is fastened, as one aspect, as well as embodiments in which the "fastened" structures are joined or fastened together.

In embodiments of the fluid conduit of this aspect of the present disclosure in which gaskets are included, it is desirable to preserve the same dimensional relationships as those described above.

The fluid conduit may comprise be a single tube or pipe 120 and that tube or pipe 120 may be formed of a single piece of material with one, or both, of the upstream coupler body 32 and the downstream coupler body 42.

As a further desirable dimensional relationship, the opening in the downstream coupler face can have an internal diameter $D_{DC}$, and the hollow circular cylindrical post protruding from the upstream coupler face can have an external diameter d, and $D_{DC}$ can be greater than d.

Use of the disclosed apparatuses provides a significant benefit for the lifetime of gaskets materials used in the couplers, and for the resulting reliability of flow reactors comprised of Glass or SiC fluidic modules. Desirably, in order to easily identify the proper location of each adaptor relative to the fluidic module (with respect to fluid direction), adapter ends having a U groove with a circular cylindrical post can be marked, such as with a machining mark. This makes it easy to prevent assembling an upstream coupler in a downstream location and vice versa.

Figure 4:
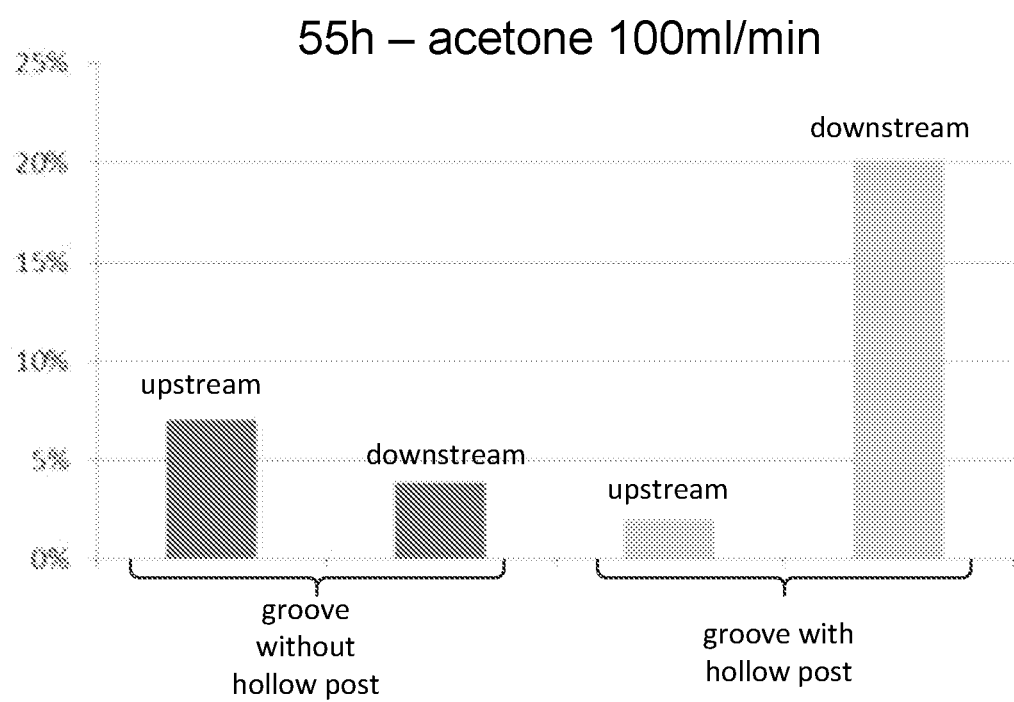
FIG. 4 is a graph of experimentally demonstrated gasket weight gain according to the coupling type and location, illustrating benefits obtained by the apparatuses and methods of the present disclosure.

Some benefits are illustrated by the results shown in FIG. 4 FIG. 4 is a graph of gasket weight gain percentage according to coupling type and location (up or downstream). As may be seen in the figure, as measured in weight gain, the least damage to the test gaskets occurred with a hollow post for upstream couplers and without a hollow post for downstream couplers. Downstream couplers with hollow posts were particularly low performing in swelling of the test gaskets (rightmost bar). Without wishing to be bound by theory, this difference is believed to be because the upstream hollow post shields the gasket from exposure to flowing reactants, in part, because the space immediately downstream of the upstream post is a zone of relatively lower pressure (relative to the hollow interior of the post) while use of a downstream hollow post creates a restriction with an associated zone of higher relative pressure (than with no post) just upstream of the post, resulting in more exposure of the downstream gasket to the reactants. In other words, in the present disclosure, the flow restrictions produced by the couplers progress from higher to lower from the input port to the output port of the fluidic module.

Use of plugs with a solid circular cylindrical post protruding from the plug face also confers advantages in that there is less dead volume resulting inside the process fluid path within fluidic modules (and thus within the associated reactor) in the area/volume near the plug. Also, the solid circular cylindrical post helps in centering the plug during assembly and helps with the protection of the plug gasket during operation of the reactor. Similarly, hollow circular cylindrical posts used on the upstream coupler faces also aid alignment during assembly of a reactor.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A flow reactor comprising:
   a fluidic module having an external surface, an internal process fluid path, and an input port and an output port each in the form of an opening in the external surface, the process fluid path extending from the input port to the output port;
   an upstream coupler connected to the input port, the upstream coupler comprising an upstream coupler body having an upstream gasket, the upstream gasket pressed against the external surface of the fluidic module by an upstream coupler face of the upstream coupler body, the upstream gasket surrounding the input port; and
   a downstream coupler connected to the output port, the downstream coupler comprising a downstream coupler body and a downstream gasket, the downstream gasket pressed against the external surface of the fluidic module by a downstream coupler face of the downstream coupler body, the downstream gasket surrounding the output port;
   wherein the upstream coupler body comprises an upstream gasket groove in the upstream coupler face holding the upstream gasket and a hollow circular cylindrical post protruding from the upstream coupler face and extending into the input port, and wherein the downstream coupler body comprises a downstream gasket groove in the downstream coupler face holding the downstream gasket and no hollow circular cylindrical post extending into the output port.

2. The flow reactor according to claim 1, wherein both (1) the upstream gasket groove has an upstream gasket groove inner diameter, the upstream gasket, in a relaxed pre-use state, has an upstream gasket inner diameter, and the upstream gasket inner diameter is smaller than the upstream gasket groove inner diameter, and (2) the downstream gasket groove has a downstream gasket groove inner diameter, the downstream gasket, in a relaxed pre-use state, has a downstream gasket inner diameter, and the downstream gasket inner diameter is smaller than the downstream gasket groove inner diameter.

3. The flow reactor according to claim 1, wherein both (1) the upstream gasket groove has an upstream gasket groove outer diameter, the upstream gasket, in the relaxed pre-use state, has an upstream gasket outer diameter, and the upstream gasket outer diameter is smaller than the upstream gasket groove outer diameter, and (2) the downstream gasket groove has a downstream gasket groove outer diameter, the downstream gasket, in the relaxed pre-use state, has a downstream gasket outer diameter, and the downstream gasket outer diameter is smaller than the downstream gasket groove outer diameter.

4. The flow reactor according to claim 1, wherein the downstream coupler face has a downstream coupler passage opening, the opening having a diameter larger than a diameter of the output port.

5. A flow reactor comprising:
   a fluidic module having an external surface, an internal process fluid path, and an input port and an output port each in the form of an opening in the external surface, the process fluid path extending from the input port to the output port;
   an upstream coupler connected to the input port, the upstream coupler comprising an upstream coupler body having an upstream gasket, the upstream gasket pressed against the external surface of the fluidic module by an upstream coupler face of the upstream coupler body, the upstream gasket surrounding the input port;
   a downstream coupler connected to the output port, the downstream coupler comprising a downstream coupler body and a downstream gasket, the downstream gasket pressed against the external surface of the fluidic module by a downstream coupler face of the downstream coupler body, the downstream gasket surrounding the output port;
   wherein the upstream coupler body comprises an upstream gasket groove in the upstream coupler face holding the upstream gasket and a hollow circular cylindrical post protruding from the upstream coupler face and extending into the input port, and wherein the downstream coupler body comprises a downstream gasket groove in the downstream coupler face holding the downstream gasket and no hollow circular cylindrical post extending into the output port;
   further comprising an unused port in the form of an opening in the external surface of the fluidic module, the unused port being in fluid communication with the process fluid path, the unused port being closed by a plug, the plug comprising a plug body and a plug gasket, the plug gasket pressed against the external surface of the fluidic module by a plug face-of the plug body, the plug gasket surrounding the unused port, wherein the plug face comprises a plug gasket groove holding the plug gasket and a solid circular cylindrical post extending into the unused port.

6. The flow reactor according to claim 5, wherein the plug gasket groove has a plug gasket groove inner diameter, the plug gasket, in a relaxed pre-use state, has a plug gasket inner diameter, and the plug gasket inner diameter is smaller than the plug gasket groove inner diameter.

7. The flow reactor according to claim 6 wherein the plug gasket groove has a plug gasket groove outer diameter, the plug gasket, in the relaxed pre-use state, has a plug gasket outer diameter, and the plug gasket outer diameter is smaller than the plug gasket groove outer diameter.

8. A fluid conduit with fluid couplers, for use in a flow reactor having modules having input and output ports in the form of openings in an external surface of the respective modules, the conduit comprising:
  a tube or pipe or a series of tubes or pipes forming a fluid conduit and having an upstream conduit end and a downstream conduit end and a passage therethrough from the upstream conduit end to the downstream conduit end;
  a downstream coupler body having a passage therethrough including an opening in a downstream coupler face of the downstream coupler body, the opening-surrounded by a downstream gasket groove in the downstream coupler face for holding a downstream gasket; and
  an upstream coupler body having a passage therethrough including an opening in an upstream coupler face surrounded by an upstream gasket groove in the upstream coupler face for holding an upstream gasket, wherein the downstream coupler body is fastened to the upstream conduit end and oriented with the downstream coupler face facing away from the downstream conduit end, and the upstream coupler body is fastened to the downstream conduit end and oriented with the upstream coupler face facing away from the downstream conduit end;
  wherein the upstream coupler body comprises a hollow circular cylindrical post protruding from the upstream coupler face, and the downstream coupler body-comprises no hollow circular cylindrical post protruding from the downstream coupler face;
  wherein the upstream gasket groove holds an upstream gasket and the downstream gasket groove holds a downstream gasket and wherein both (1) the upstream gasket groove has an upstream gasket groove inner diameter, the upstream gasket, in a relaxed pre-use state, has an upstream gasket inner diameter, and the upstream gasket inner diameter is smaller than the upstream gasket groove inner diameter; and (2) the downstream gasket groove has a downstream gasket groove inner diameter, the downstream gasket, in a relaxed pre-use state, has a downstream gasket inner diameter, and the downstream gasket inner diameter is smaller than the downstream gasket groove inner diameter.

9. The fluid conduit according to claim 8, wherein both (1) the upstream gasket groove has an upstream gasket groove outer diameter, the upstream gasket, in the relaxed pre-use state, has an upstream gasket outer diameter, and the upstream gasket outer diameter is smaller than the upstream gasket groove outer diameter; and (2) the downstream gasket groove has a downstream gasket groove outer diameter, the downstream gasket, in the relaxed pre-use state, has a downstream gasket outer diameter, and the downstream gasket outer diameter is smaller than the downstream gasket groove outer diameter.

10. The fluid conduit according to claim 8, wherein the tube or pipe or a series of tubes or pipes is a tube or pipe, and wherein the tube or pipe and one, or both, of the upstream coupler and the downstream coupler are formed of a single piece.

11. The fluid conduit according to claim 8, wherein the opening in the downstream coupler face has a diameter $D_{DC}$, and the hollow circular cylindrical post protruding from the upstream coupler face has a diameter d, and wherein $D_{DC} > d$.

* * * * *